May 26, 1925.
W. E. WILLIAMS
SHEET STEEL DISK WHEEL
Filed Oct. 9, 1922      2 Sheets-Sheet 1
1,539,065
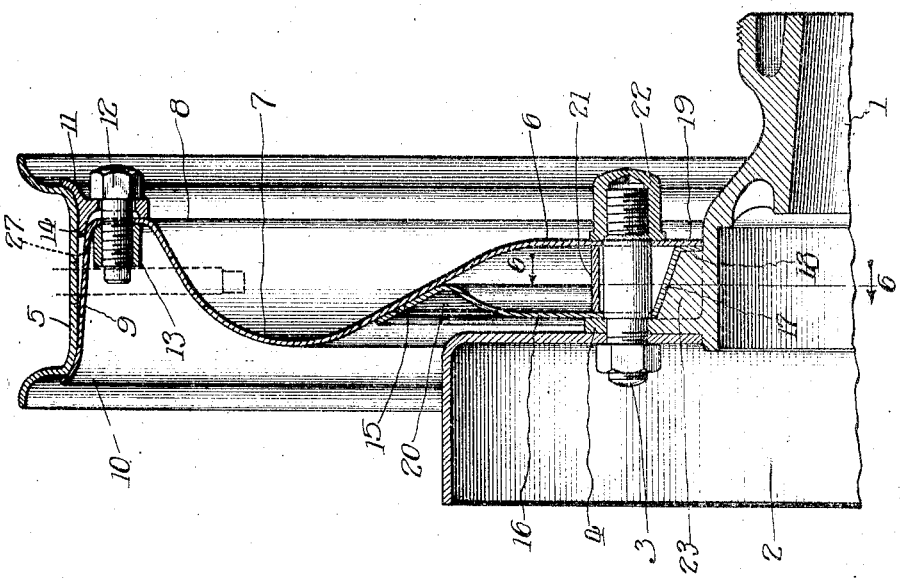
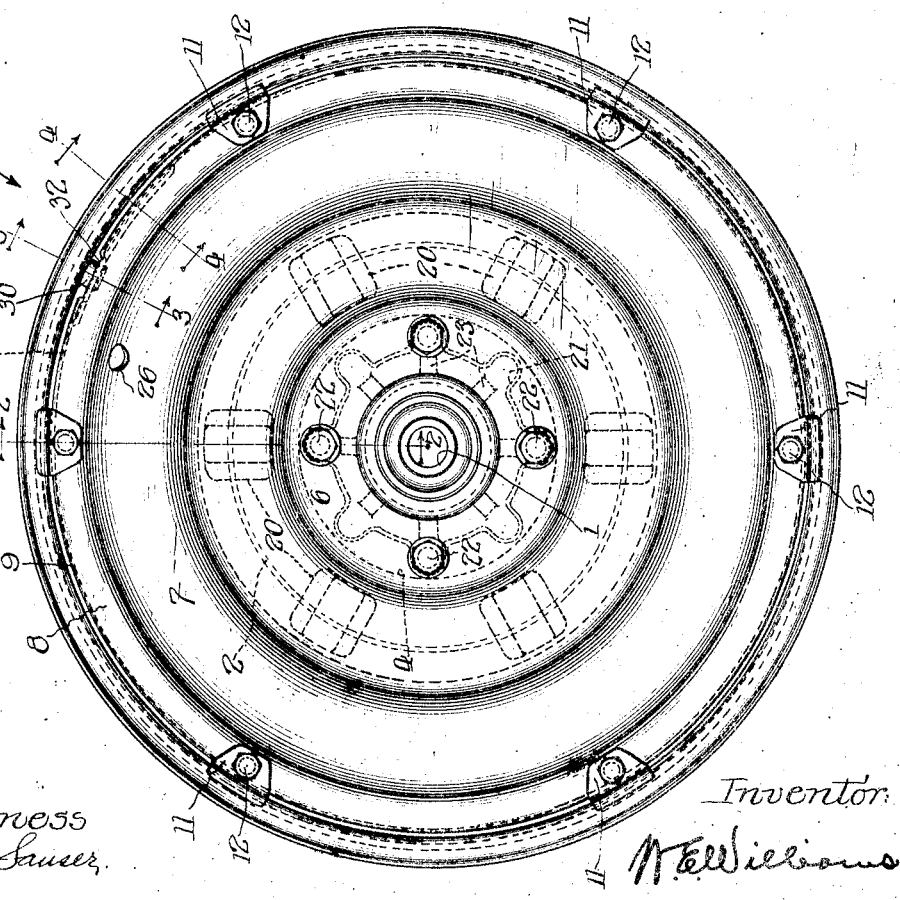
Witness
Inventor
W. E. Williams May 26, 1925.  
W. E. WILLIAMS  
SHEET STEEL DISK WHEEL  
Filed Oct. 9, 1922   2 Sheets-Sheet 2
1,539,065
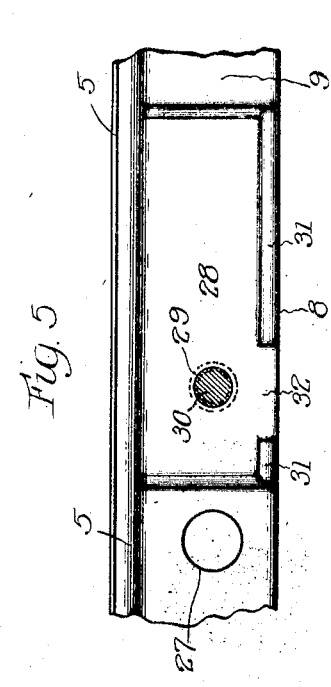
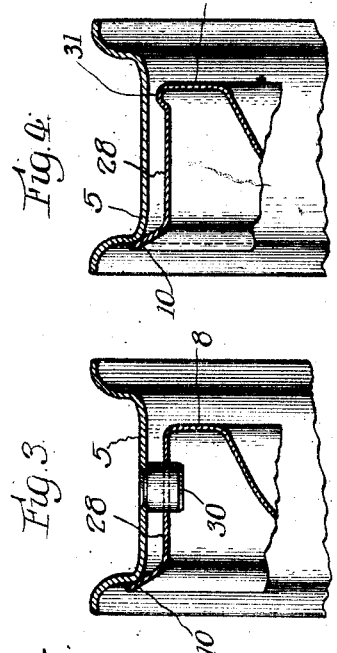
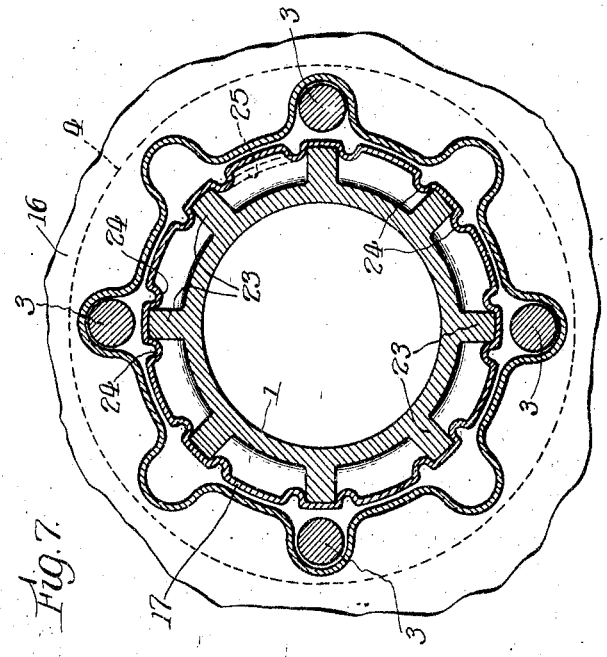
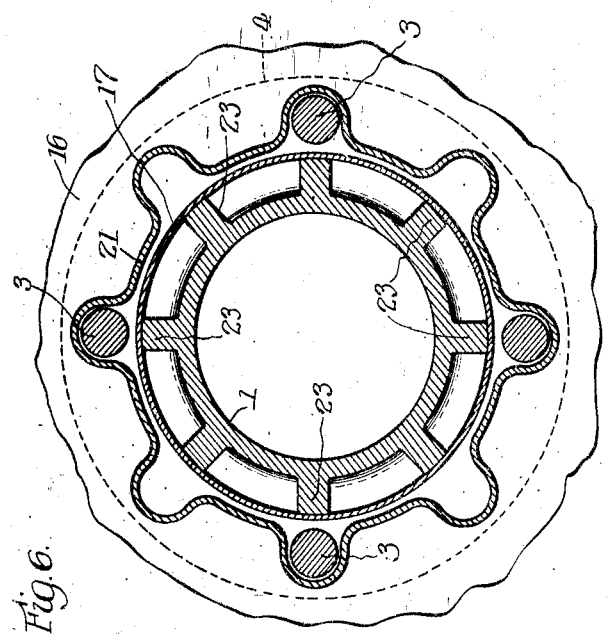

Patented May 26, 1925.

1,539,065

UNITED STATES PATENT OFFICE.

WILLIAM ERASTUS WILLIAMS, OF WILMETTE, ILLINOIS, ASSIGNOR TO AMERICAN STEEL FOUNDRIES, OF CHICAGO, ILLINOIS, A CORPORATION OF NEW JERSEY.

SHEET STEEL DISK WHEEL.

Application filed October 9, 1922. Serial No. 593,376.

*To all whom it may concern:*

Be it known that I, WILLIAM ERASTUS WILLIAMS, a citizen of the United States, and a resident of Wilmette, county of Cook, State of Illinois, have invented a new and useful Improvement in Sheet Steel Disk Wheels, of which the following is a specification.

The object of my invention is to make a strong and light wheel and one that may be used for automobile purposes and be adapted to be demounted as a wheel and also to provide for a demountable rim.

Reference will be had to the accompanying drawings in which Figure 1 is a front elevation of the wheel.

Figure 2 is a sectional elevation.

Figure 3 is a transverse section of the rim portion on line 3—3 on Figure 1.

Figure 4 is a section similar to that of Figure 3 but is taken on line 4—4 on Figure 1.

Figure 5 is an edge view of a portion of the rim of the disk looking in the direction of the arrow *a* of Fig. 1.

Figure 6 is a transverse section of the hub barrel on line 6—6 on Figure 2.

Figure 7 is a view similar to that of Figure 6, showing a modified form of the parts.

In the drawing 1 indicates the hub of an automobile wheel, 2 the brake drum, 3 a series of studs that secure the wheel and brake drum to a flange 4 integral with the hub, and 5 an ordinary split rim for use with a straight side pneumatic tire. The main web of the wheel is made of a sheet of metal, having the front surface 6 around the hub zone merged into a concave surface 7 and it in turn merged into a front felloe surface 8, and this surface is turned over into an approximately conical flange 9 provided with an outwardly turned marginal edge 10 which furnishes the support for one edge of the pneumatic tire rim 5.

A series of locking clips 11 are held in place by screws 12, screwed into fixed nuts 13, and thus furnish the seat for the front edge of the pneumatic rim. The clips 11 are provided with bearing portions 14 resting on the edge of the disk and between the rim 5 and the disk.

The main disk or web of the wheel is made of relatively thin steel but is reinforced by a secondary disk in contact with the main disk at 15 and from thence extending toward the center with its surface 16 in contact with the flange 4 of the hub. Around the hub barrel this secondary disk is embossed to form the inclined annular portion 17 which is merged into a narrow vertical flange 18 joined to the main disk at 19.

The secondary disk is stiffened across from the surface 16 to its outer margin by a series of corrugations 20 which have the effect of extending the surface 16 at intervals across into contact with the main disk.

The main disk and the secondary disk are stiffened across between the surfaces 6 and 16 by means of a spreader ring 21, adapted to take the direct thrust of the clamping bolts 3 under strain of their outer nuts 22 which serve to hold the wheel on the hub. This ring 21 is looped around the bolts 3 as shown in Figures 6 and 7 to better sustain the plates or disks under the strain of the said bolts, and also for the purpose of taking some of the torque thrust and thereby relieving the marginal edges of the plates or disks at the perforations for the bolts 3.

The main disk and the reinforcing disk are spot welded or otherwise suitably fastened at the surface 15 and around the hub aperture at the surfaces 18 and 19.

The spreader ring 21 is also spot welded to the disk on each side, thus rigidly uniting it to the disks.

The hub here shown is of the general outline used with wooden wheels, but to accommodate it for a demounting wheel purpose, I provide inclined bearing blocks 23, integral with the hub in order to provide a seat for the inclined annular portion 17 of the disk.

The modified form, as shown in Figure 7, shows the surface 17 of the reinforcing disk provided with indentations 24 that embrace the corners of the portions or blocks 23 of the hub for the purpose of taking some of the driving torque from the bolts 3.

The portion 7 of the main disk extends inwardly sufficiently to permit the use of a straight valve stem of the pneumatic tire, and the disk is perforated on the front face as shown by 26 on Figure 1 and through the tread flange also as indicated by 27, Figure 5, the two perforations being in line to admit a straight valve stem which is shown in position by dotted lines in Figure 2.

A portion of the rim flange 9, see Figures 3, 4 and 5, is embossed inward, as is indicated by the surface 28 in Figure 5, and this portion is perforated at 29 to admit the driving lug 30 secured to the rim. The purpose of embossing this portion is to permit the seating of the coupling members that connect the ends of a split rim. In order to make the gap as narrow as possible between the front corner of the main disk at the felloe portion 8 and the inside edge of the rim, I provide, as it were, a ribbed portion 31 for the depressed portion 28, but this ribbed portion is wanting or is absent at 32 for convenience or clearance of the lock-member of the end connection of the split rim 5.

What I claim is:—

1. In a wheel of the class described, the web of the wheel composed of a concave disk reinforced on the back by a secondary disk terminating in a zone about midway from the hub to the rim and joined thereat to the main web and thence spaced asunder from the main disk web and adapted to abut laterally against a hub flange, and from this flange the said secondary disk having an outwardly inclined extending annular zone bearing on inclined bearing surfaces of the hub body, and the two disks joined together at the aperture of the hub barrel.

2. In a device of the class described, a main disk and a reinforcing disk, the latter covering the zone for a distance around the hub barrel, and the two disks connected together at the outer margin of the reinforcing disk and at the aperture around the hub and spaced apart in a zone between these points of connection, and said reinforcing disk provided with an inclined bearing surface adapted to register on an inclined surface on the hub barrel, in combination with a separator member lying between the two disks in their separated region and adapted to sustain the thrust of clamping bolts in combination with a series of clamping bolts passing through both plates and adapted to secure the wheel to the hub.

3. In a device of the class described, a front disk forming the main web of the wheel in combination with a reinforcing disk at the rear of the main disk and the latter formed with inclined bearing surfaces adapted to bear upon and support the main disk and also bear on an inclined surface on the hub barrel, the two disks spaced apart between the said bearing regions; in combination with a separator portion acting as a spreader between the separated areas of the disks and this separator portion looped around the bolt holes through which pass the bolts which fasten the disks to the hub, and a series of clamping bolts passing through the loops on the separator portion and adapted to hold the disks to the hub.

4. In a wheel of the class described, a disk forming the web of the wheel having a vertically disposed area surrounding the hub barrel, a secondary reinforcing disk at the rear of the main disk and joined to the main disk at the hub aperture and inclined inward from this juncture and bearing upon an inclined surface on the hub barrel and thence extending radially outward and joined to the main disk in a region approximately half-way between the hub and the rim.

5. In a wheel of the class described, a main disk and a reinforcing disk and the two spaced asunder in the region of the location of the hub bolts and stiffened across by a filler spreader composed of a flat piece of metal looped around the bolt holes, in combination with a series of bolts passing through both disks and adapted to hold the same to the hub.

6. In a wheel of the class described, a main disk forming the web of the wheel in combination with a reinforcing disk connected to the main disk and seating on the hub barrel and provided with a series of engaging indentations and the hub barrel provided with a series of projections adapted to be engaged with the indentations in the reinforcing disk and thus assist in resisting the torque strains between the hub and the disks.

Signed at Chicago, in the county of Cook and State of Illinois, this 2nd day of October, 1922.

WILLIAM ERASTUS WILLIAMS.

Witnesses:—
   Jos. E. Love,
   B. J. Bernhard.